United States Patent
Momtaz

(10) Patent No.: US 7,436,882 B2
(45) Date of Patent: *Oct. 14, 2008

(54) DECISION FEEDBACK EQUALIZER AND CLOCK AND DATA RECOVERY CIRCUIT FOR HIGH SPEED APPLICATIONS

(75) Inventor: Afshin Momtaz, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 729 days.

This patent is subject to a terminal disclaimer.

(21) Appl. No.: 10/774,965

(22) Filed: Feb. 9, 2004

(65) Prior Publication Data

US 2005/0135510 A1    Jun. 23, 2005

Related U.S. Application Data

(60) Provisional application No. 60/531,402, filed on Dec. 19, 2003.

(51) Int. Cl.
   *H03H 7/30*    (2006.01)
   *H03K 5/159*   (2006.01)
   *H03D 3/24*    (2006.01)
(52) U.S. Cl. .................. 375/233; 375/375; 375/376
(58) Field of Classification Search ............... 375/233, 375/327, 340, 350, 376, 375; 327/156; 331/1 A, 331/1 R, 18, 25
See application file for complete search history.

(56) References Cited

U.S. PATENT DOCUMENTS

| 4,787,097  A  * | 11/1988 | Rizzo .................... 375/375 |
| 5,786,951  A  * |  7/1998 | Welland et al. ............ 360/46 |
| 6,556,637  B1   |  4/2003 | Moriuchi |
| 6,670,853  B2 * | 12/2003 | Kim et al. ................ 331/1 A |
| 6,807,225  B1 * | 10/2004 | Tonietto et al. ........... 375/219 |
| 6,873,669  B2 * |  3/2005 | Nakamura ................ 375/375 |
| 6,931,088  B1 * |  8/2005 | Tomita .................... 375/376 |
| 2003/0053576 A1* |  3/2003 | Cao ........................ 375/375 |
| 2004/0120422 A1* |  6/2004 | Lin et al. ................. 375/232 |
| 2004/0258145 A1  | 12/2004 | Popescu et al. |

FOREIGN PATENT DOCUMENTS

WO    WO 2004/002023 A2    12/2003

OTHER PUBLICATIONS

European Search Report and Annex for Application No. EP04026612; date of completion Dec. 8, 2005, The Hague (2 pages).

* cited by examiner

*Primary Examiner*—Betsy L Deppe

(57) ABSTRACT

A method for communicating data includes equalizing received data to reduce channel related distortion in the received data. A clock having frequency and/or phase fixed relative to the equalized data is extracted from the equalized data. The extracted clock is used to clock a retimer to generate recovered data.

11 Claims, 7 Drawing Sheets

DECISION FEEDBACK EQUALIZER AND CLOCK AND DATA RECOVERY CIRCUIT FOR HIGH SPEED APPLICATIONS

CROSS-REFERENCE TO RELATED APPLICATION(S)

This application claims the benefit of U.S. Provisional Patent Application Ser. No. 60/531,402, entitled "DECISION FEEDBACK EQUALIZER AND CLOCK AND DATA RECOVERY CIRCUIT FOR HIGH SPEED APPLICATIONS", filed Dec. 19, 2003, the disclosure of which is incorporated herein by reference.

This application is related to U.S. Provisional Patent Application Ser. No. 60/531,403, entitled "CONTINUOUS TIME FILTER-DECISION FEEDBACK EQUALIZER ARCHITECTURE FOR OPTICAL CHANNEL EQUALIZATION", filed Dec. 19, 2003; and U.S. Provisional Patent Application Ser. No. 60/530,968, entitled "USING CLOCK AND DATA RECOVERY PHASE ADJUST TO SET LOOP DELAY OF A DECISION FEEDBACK EQUALIZER", filed Dec. 19, 2003; and U.S. Provisional Patent Application Ser. No. 60/531,094, entitled "INTEGRATED DECISION FEEDBACK EQUALIZER AND CLOCK AND DATA RECOVERY", filed Dec. 19, 2003, the disclosure of each which is incorporated herein by reference.

BACKGROUND

Many high speed serial communication systems only transmit data over the communication media. In other words, these systems do not transmit clock signals that may be used by a receiver to recover the data. Consequently, receivers for high speed serial communication systems typically include clock and data recovery circuits that produce a clock signal synchronized with the incoming data that is then used to recover the data. Data is typically recovered by generating a clock signal at a frequency that matches the frequency of an incoming data stream. The clock is then used to sample or recover the individual data bits.

For example, FIG. 1 illustrates a typical receiver that utilizes a clock and data recovery circuit 10 and retimer 20 to generate recovered data 30. Typically incoming data 40 is amplified by one or more buffer stages 50 and the clock and data recovery circuit 10 generates an extracted clock signal 70 that has a phase and/or frequency that is fixed relative to the phase and/or frequency of the incoming amplified data 80.

The clock and data recovery circuit 10 may comprise a phase lock loop or delay lock loop that aligns the edges of the extracted clock, for example the rising edge, with the transition edge of the incoming data. In this instance the falling edge of the clock is approximately in the middle of the incoming data symbol. In this instance the retimer 20 may comprise, by way of example, a falling edge flip-flop that is triggered to recover the transmitted data on the falling edge of the clock.

In operation however, bandwidth limitations inherent in many communication media tend to create increasing levels of data distortion with increasing data rate and channel length. For example, band-limited channels tend to spread transmitted pulses. If the width of the spread pulse exceeds a symbol duration, overlap with neighboring pulses may occur, degrading the performance of the receiver. Therefore, typical high speed receivers may also include an adaptive equalizer, such as, for example, a decision feedback equalizer that cancels or reduces inter-symbol interference caused by micro-reflections in the channel.

For example, FIG. 2 is a simplified block diagram of a conventional one tap decision feedback equalizer 200 where a summer 210 combines the incoming data 220 with a feedback signal 230. A slicer 240 converts the output of the summer (soft decision) to a binary signal. A flip-flop 250 recovers the data from the binary signal in response to a clock 260. A multiplier 270 scales the recovered data by an equalization coefficient (g1) to generate the feedback signal 230 (typically a negative number) that is then combined with incoming data. The equalizer therefore serves to subtract a previous symbol from a current symbol to reduce or eliminate channel induced distortion such as inter-symbol interference.

In conventional receivers the extracted clock from the clock and data recovery circuit drives the flip-flop to recover equalized data. For example, FIG. 3 is a simplified block diagram of a decision feedback equalizer and clock and data recovery circuit based receiver 300. In this receiver incoming data is again amplified by one or more buffer stages 310. The clock and data recovery circuit 320 generates an extracted clock 330 from the amplified data (D1) and drives the decision feedback equalizer flip-flop 340 that recovers the equalized (D2) data provided by slicer 350.

In the illustrated receiver the clock and data recovery circuit 320 aligns the rising edge of the extracted clock 330 with the transition edge of the amplified data D1. In practice, however, the rising edge of the extracted clock 330 should be aligned with the equalized data (D2) output by the slicer 350 for proper data recovery by flip-flop 340. Therefore, the time delay through summer 360 and slicer 350 should be equal to the time delay through buffer stage(s) 310 to ensure that the input data (D2) and clock signal 330 of flip-flop 340 are aligned to properly recover the equalizer data.

Accordingly, conventional receivers typically include delay matching stages (not shown) to adjust the delay through the buffer stage(s) 310 to match the delay through summer 360 and slicer 350 to align the binary signal (D2) and extracted clock signal 330. In practice, however, process variations and performance variations over temperature may make it difficult to match the delay through the buffer stage(s) with the delay through the summer and slicer, thereby limiting the performance of conventional receivers.

Further, when inter-symbol interference is relatively large the clock and data recovery circuit may no longer properly track the transition edges of the incoming data. In these instances the extracted clock signal 330 is no longer locked to or synchronized with the incoming data stream and the recovered equalized data may be corrupted. Therefore conventional receivers often have limited tolerance to inter-symbol interference.

SUMMARY

In one aspect of the present invention a communications system includes an equalizer adapted to reduce channel related distortion in received data and a clock and data recovery circuit coupled to the equalizer. In this aspect of the present invention the clock and data recovery circuit generates an extracted clock signal from the equalized data and an equalizer retimer generates recovered equalized data from the equalized data in response to the extracted clock signal.

BRIEF DESCRIPTION OF THE DRAWINGS

These and other features, aspects, and advantages of the present invention will become better understood with regard to the following description, appended claims, and accompanying drawings, in which:

Figure 1:
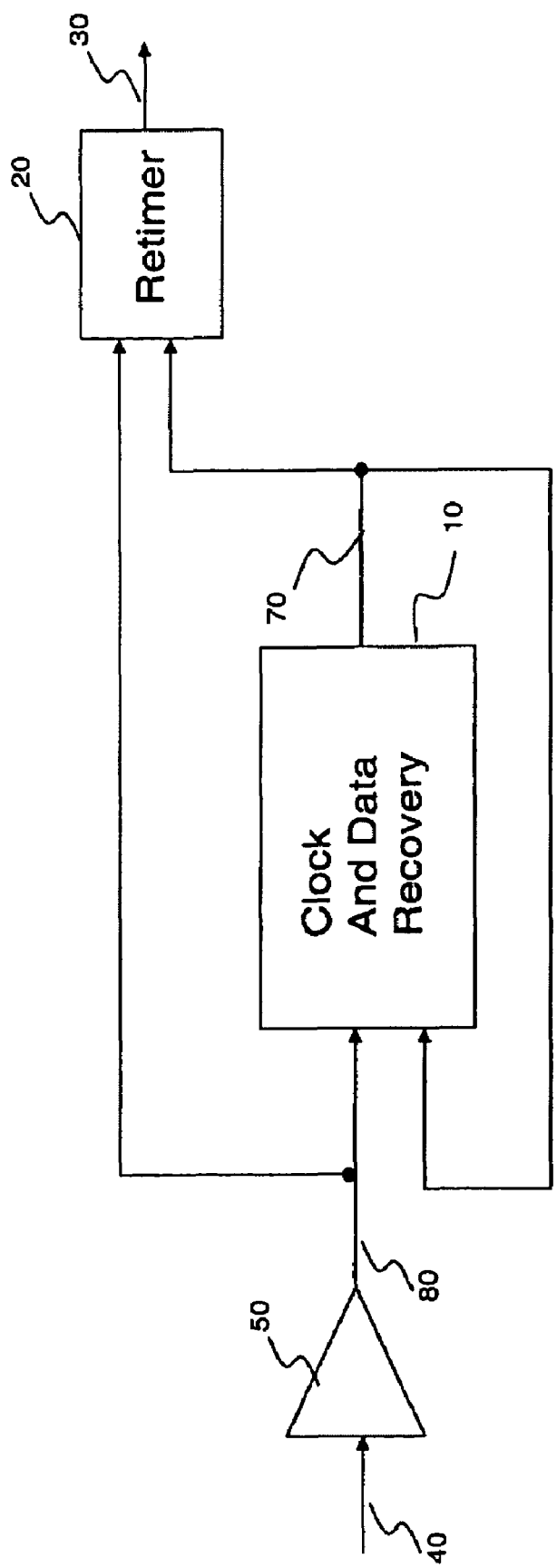
FIG. 1 is a simplified block diagram of one embodiment of a clock and data recovery circuit.
Figure 2:
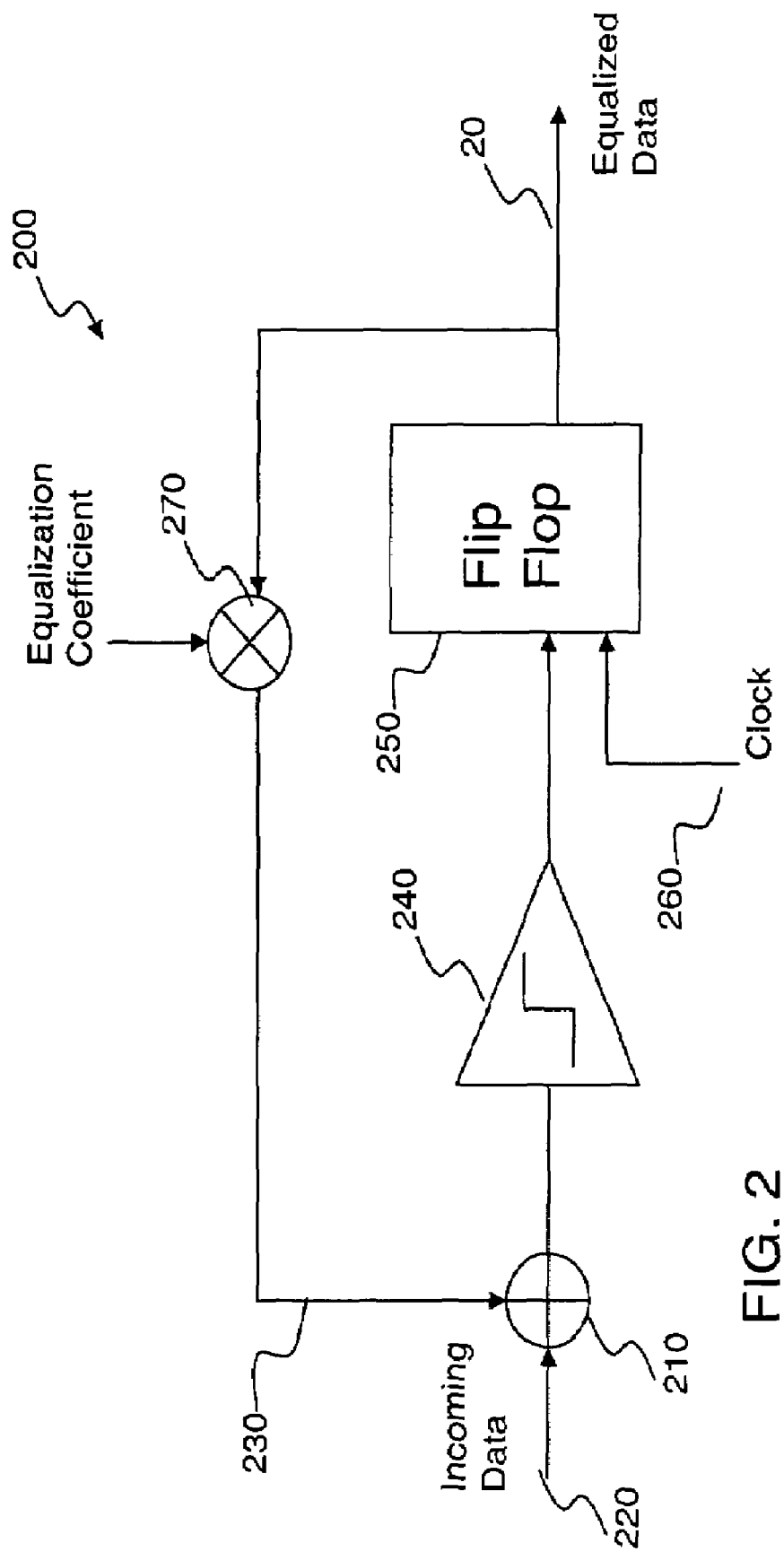
FIG. 2 is a simplified block diagram of one embodiment of a decision feedback equalizer.

In accordance with common practice the various features illustrated in the drawings are not to scale. On the contrary, the dimensions of the various features are arbitrarily expanded or reduced for clarity. In addition like reference numerals denote like features throughout the specification and figures.

DETAILED DESCRIPTION

Figure 4:
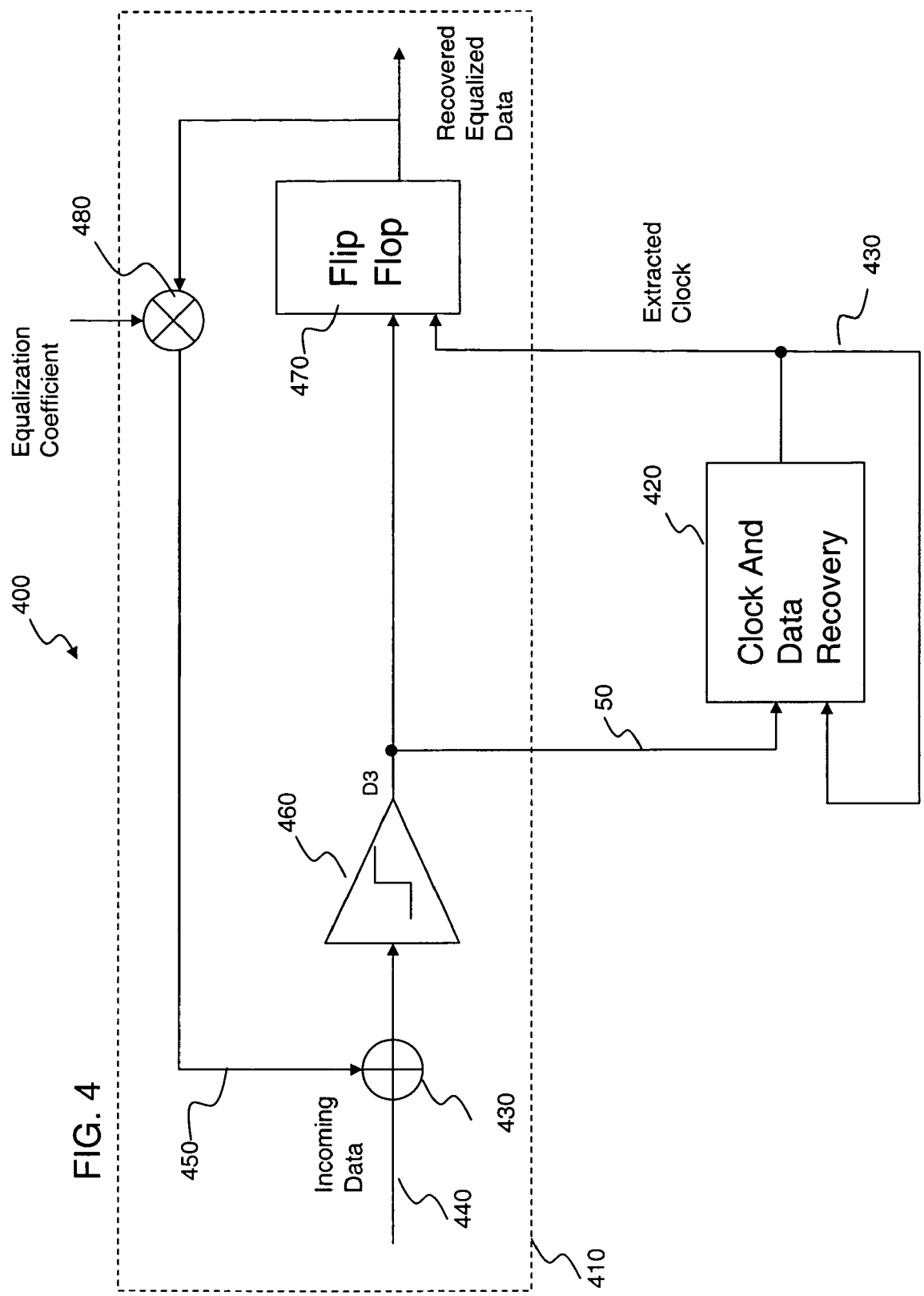
FIG. 4 is a simplified block diagram of an integrated decision feedback equalizer and a clock and data recovery circuit in accordance with an exemplary embodiment of the present invention.

Some embodiments of the present invention provide a high speed receiver with clock and data recovery and decision feedback equalization. Referring to FIG. 4, in one embodiment a one tap decision feedback equalizer 410 is combined with a clock and data recovery circuit 420 to provide a high performance receiver 400. In this embodiment summer 430 combines the incoming data 440 with an equalized feedback signal 450. A slicer 460 converts the output of the summer (soft decision) to a binary signal (D3).

Figure 3:
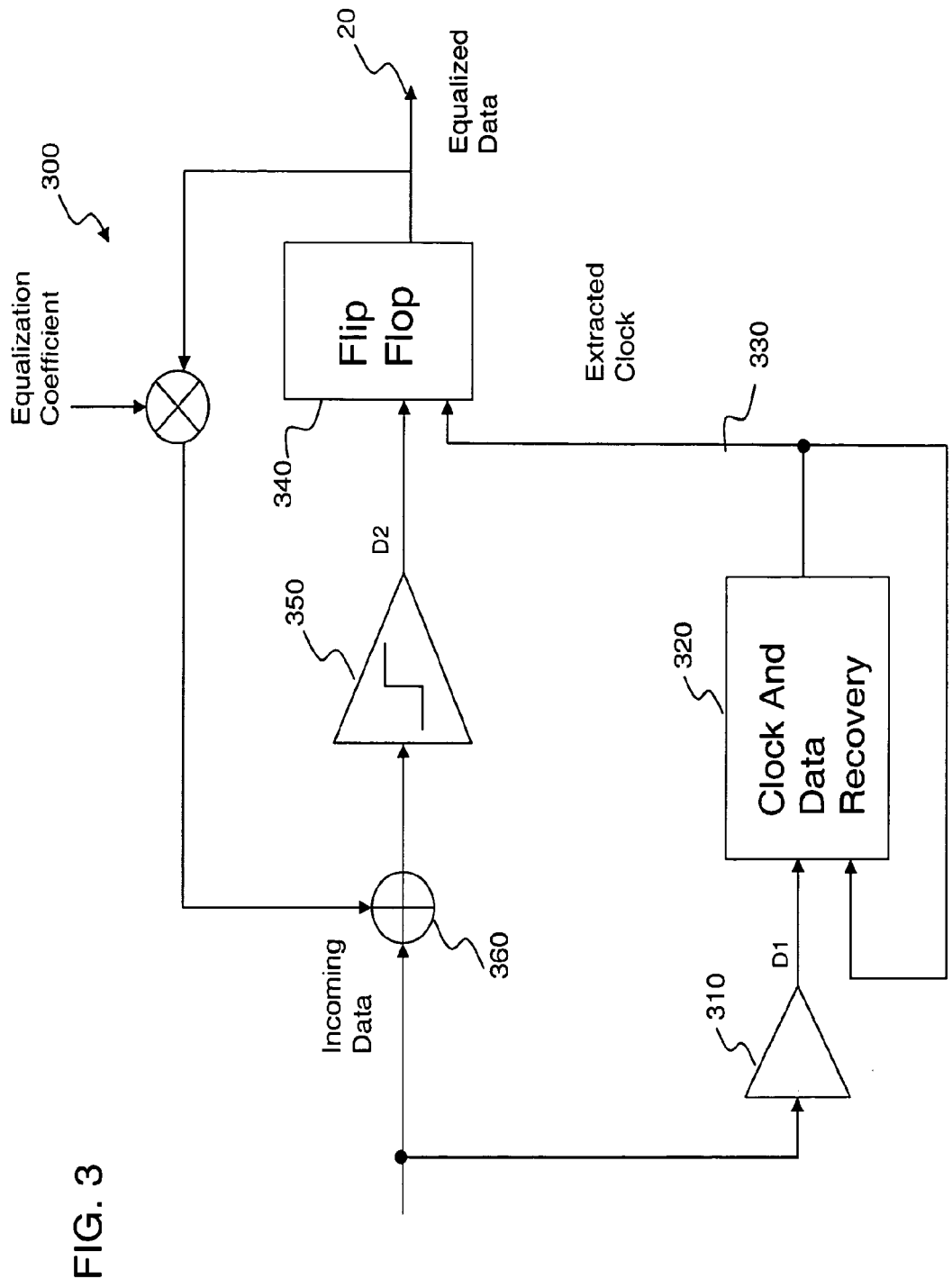
FIG. 3 is a simplified block diagram of one embodiment of an integrated decision feedback equalizer and clock and data recovery circuit.

In this embodiment, the binary signal output by the slicer 460 directly drives the data input of flip-flop 470 as well as the clock and data recovery circuit 420. The clock and data recovery circuit 420 therefore generates an extracted clock signal from the binary signal (D3) output by the slicer rather than from the incoming data 440 as is done in conventional receivers (see FIG. 3). The extracted clock output by the clock and data recovery circuit 420 is then used lock the decision feedback equalizer flip-flop 470 that recovers the data from the binary signal (D3) in response to the extracted clock.

The clock and data recovery circuit 420 may automatically align the rising edge of the extracted clock, for example, with transitions in the binary signal (D3) output by the slicer 460. Therefore, the illustrated embodiment may maintain the proper timing relationship between the flip-flop 470 drive data (D3) and clock (i.e. the extracted clock) to ensure proper data recovery without the need for additional delay matching stages. The elimination of high speed delay matching circuits reduces the power consumption and die area of the receiver.

In the illustrated embodiment a multiplier 480 scales the recovered equalized data output by the flip-flop 470 by an equalization coefficient (g1) to generate the equalized feedback signal 450. The value of the equalization coefficient depends on the level of inter-symbol interference that is present in the incoming data. Typically the absolute value of the equalization coefficient (usually a negative number) increases with increasing inter-symbol interference. In one embodiment a real time optimization loop (not shown), such as a least mean square optimization loop, monitors the bit error rate of the incoming signal and adjusts the value of the equalization coefficient in response to changes in the bit error rate.

Summer 430 then combines the equalized feedback signal 450 (typically a negative number) with the incoming data 440. The summer therefore subtracts a scaled version of the previous symbol from a current symbol to reduce or eliminate channel induced distortion such as inter-symbol interference. Therefore, in this embodiment, equalized data (i.e. data that has been processed to remove inter-symbol interference) drives the clock and data recovery circuit 420. As a result, the clock and data recovery circuit 420 more readily locks onto the binary signal (D3) as compared to a receiver that locks onto the incoming data.

Thus, the illustrated embodiment of the present invention may have increased tolerance to inter-symbol interference as compared to conventional receivers because the equalizer 410 compensates for the interference prior to driving the clock and data recovery circuit 420. In addition, in one embodiment the equalization coefficient (g1) is set at a value that is approximately equal to one-half of it's maximum value at startup to ensure that the clock and data recovery circuit 420 locks onto the transitions in the equalized data even in the presence of high inter-symbol interference at start-up.

In this embodiment, a frequency lock detector (not shown) determines whether the clock and data recovery circuit has locked onto the frequency of the equalized data. If not, the equalization coefficient is automatically iterated until the clock and data recovery circuit 420 synchronizes with the frequency of the equalized data at which point a real time optimization loop (not shown) adjusts the equalization coefficient to reduce or minimize the inter-symbol interference in the equalized data.

Figure 5:
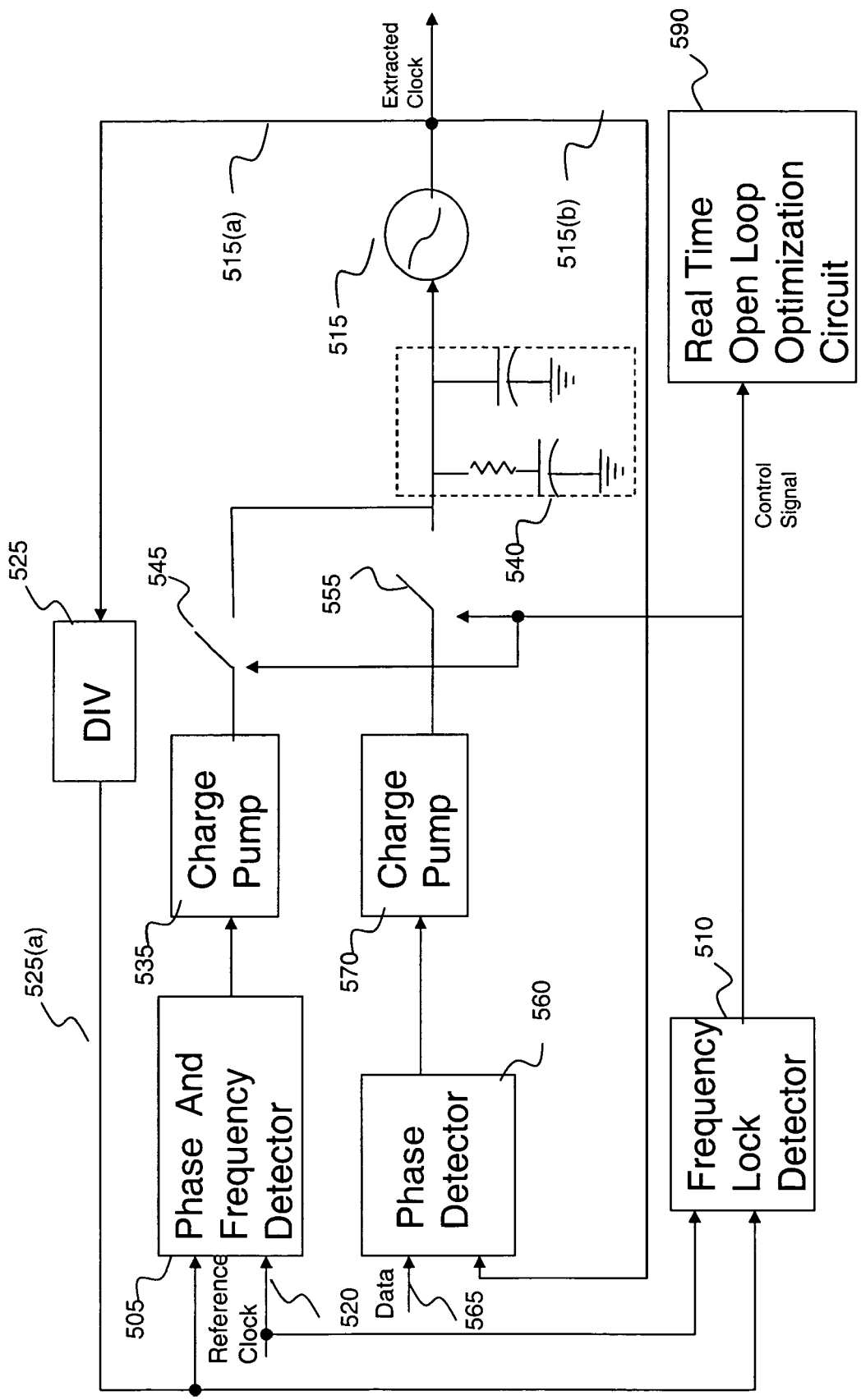
FIG. 5 is a simplified block diagram of a clock and data recovery circuit with a frequency lock detector in accordance with an exemplary embodiment of the present invention.

For example, FIG. 5 is a simplified block diagram of a conventional clock and data recovery circuit 500 integrated with a frequency lock detector 510 for generating an extracted clock signal and controlling a real time open loop optimization circuit 590 that generates the equalization coefficient (g1) of the decision feedback equalizer of FIG. 4. In the illustrated embodiment the clock and data recovery circuit includes a frequency acquisition loop and a phase lock loop. The phase lock loop may operate concurrently or sequentially with the frequency acquisition loop.

In one embodiment, for example, the frequency acquisition loop may first tune the output signal of a voltage controlled oscillator 515 to approximately the desired frequency before the phase lock loop is activated. After frequency acquisition the phase lock loop adjusts the phase of the extracted clock to maintain a fixed relationship between the phase of the incoming data signal (e.g. the binary signal (D3) of FIG. 4) and the extracted clock signal.

For example, at start up, a phase and frequency detector 505 determines the frequency difference between a fixed reference clock 520 and a feedback signal 515(a) generated by the voltage controlled oscillator 515. In one embodiment the reference clock 520 is, by way of example, a relatively low-frequency signal generated by a stable oscillation source (e.g., a crystal). In one embodiment, the feedback signal 515(a) output by the voltage controlled oscillator 515 may be divided down in frequency by, for example, a divider 525. The phase and frequency detector 505 then compares the frequency of the divided signal 525(a) with the frequency of the reference clock 520.

In this embodiment the phase and frequency detector 505 generates an output signal that corresponds to the frequency difference between the reference clock 520 and the divided signal 525(a). A charge pump 535 then generates a current signal whose magnitude varies as a function of the magnitude of the output signal of the phase and frequency detector 505. A loop filter 540 then filters out the high frequency components of the current signal output by charge pump 535 and forwards the filtered signal to the voltage controlled oscillator 515.

In this embodiment, if the reference clock leads the divided feedback signal 525(*a*) output by divider 525, the frequency of the feedback signal 515(*a*) output by the voltage controller oscillator 515 is less than the frequency of the reference clock 520. In this instance, the charge pump 535 increases its output current to provide a control signal which increases the frequency of the feedback signal 515(*a*) output by the voltage control oscillator 515.

Similarly, if the reference clock lags the divided feedback signal 525(*a*) output by divider 525, the frequency of the feedback signal 515(*a*) output by the voltage controller oscillator 515 is greater than the frequency of the reference clock. In this instance, the charge pump 535 decreases its output current to provide a control signal which decreases the frequency of the feedback signal 515(*a*) output by the voltage control oscillator 515.

In the illustrated embodiment the output of the voltage controlled oscillator 515 is provided to the frequency detector 505 as a feedback signal. Therefore, the frequency of the feedback signal 515(*a*) output by the voltage controlled oscillator 515 may be adjusted with greater precision until, for example, a particular threshold condition is satisfied.

For instance, in one embodiment a frequency lock detector 510 determines the relative shift between the frequency of the reference clock 520 and the frequency of the divided signal 525(*a*). The frequency lock detector 510 then compares this frequency difference to a threshold to determine if the frequency of the feedback signal 515(*a*) sufficiently matches the frequency of the reference clock.

In one embodiment, the frequency lock detector 510 comprises, by way of example, a pair of counters (not shown) that are reset upon start up. In this embodiment a first counter counts the edges of the reference clock and the second counter counts the transition edges of the divided signal. When one of the counters reaches a predetermined count value the frequency lock detector compares the difference between the count values of each counter to a count threshold. If the count difference is less than the count threshold the reference clock has been acquired.

In this instance, the frequency lock detector 510 outputs a control signal to activate a real time optimization loop 590 that adjusts the equalization coefficient of the decision feedback equalizer of FIG. 4 to reduce inter-symbol interference. In addition, in one embodiment the frequency lock detector 510 opens switch 545 to deactivate the frequency acquisition loop and closes switch 555 to activate the phase lock loop.

The phase lock loop includes a phase detector 560 that receives, by way of example, a data signal 565 (e.g. the binary signal (D3) output by the slicer of FIG. 4) on a first input and the output 515(*b*) of the voltage control oscillator at a second input. In one embodiment, the phase detector 560 determines a phase relationship between the output 515(*b*) of the voltage control oscillator 515 and the data signal 565. For example, in one embodiment the phase detector 560 compares transitions in the data signal to the rising edges or the falling edges of the output 515(*b*) of the voltage control oscillator. The phase detector 560 then produces, by way of example, an error signal that is proportional to the phase relationship.

A charge pump 570 then generates a current signal whose magnitude varies as a function of the magnitude of the output signal of the phase detector 560. The loop filter 540 then filters out the high frequency components of the current signal output by charge pump 570 and forwards the filtered signal to the voltage controlled oscillator 515.

In one embodiment, if the data signal leads the output signal 515(*b*) of the voltage control oscillator 515, the frequency of the output signal 515(*b*) of the voltage controller oscillator 515 is less than the frequency of the data signal 565. In this instance, the charge pump 570 increases its output current to provide a control signal which increases the frequency of the output signal 515(*b*) of the voltage control oscillator 515.

As the frequency of the output signal 515(*b*) of the voltage control oscillator 515 increases, its edges come sooner in time (i.e., the edges advance in time). Thus, for example, the rising edges of the output signal 515(*b*) of the voltage control oscillator 515 come in better alignment with the transitions or other reference points in the data signal 565. The feedback may, therefore, insure that the data signal and the output signal 515(*b*) of the voltage control oscillator 515 have the desired phase relationship for retiming the data via a data retimer (e.g. flip-flop 470 of FIG. 4). When the desired phase relationship is reached via the feedback, then the loop may be deemed to be locked.

One of skill in the art will appreciate that the present invention is not limited to a particular clock and data recovery circuit. Rather the present invention is equally applicable to all clock and data recovery circuits that generate an extracted clock having a fixed phase and/or frequency relationship with a data signal. In addition, although illustrated as separate components, the present invention also contemplates different levels of integration. For example, the phase detector 560 may be integrated, at least in part, with the frequency detector 505. In addition, although many of the signals are illustrated as single-ended signals, the present Invention also contemplates that some signals may be differential signals.

In addition, referring back to FIG. 4, one of skill in the art will also appreciate that the output of the summer (i.e. the soft decision) could also be used to drive the clock and data recovery circuit to provide a receiver having increased inter-symbol interference tolerance. However, in the receiver illustrated in FIG. 4, the slicer 460 effectively amplifies the incoming data to a suitable level to drive the clock and data recovery circuit 420. The illustrated embodiment therefore allows for the elimination of the buffer stages that are typically used to amplify the incoming data prior to clock recovery in a conventional receiver system. The illustrated integration of the decision feedback equalizer 410 and clock and data recovery circuit 420 reduces the cost and power consumption of receiver 400 as compared to conventional systems.

For example, in high speed applications the elimination of the high speed buffer stage(s) for the clock and data recovery circuit can significantly reduce the cost and the die size of the receiver. More specifically, high speed receiver components fabricated from a complementary metal oxide semiconductor (CMOS) process may include shunt peaking inductive loads to improve the bandwidth of the component.

Figure 6:
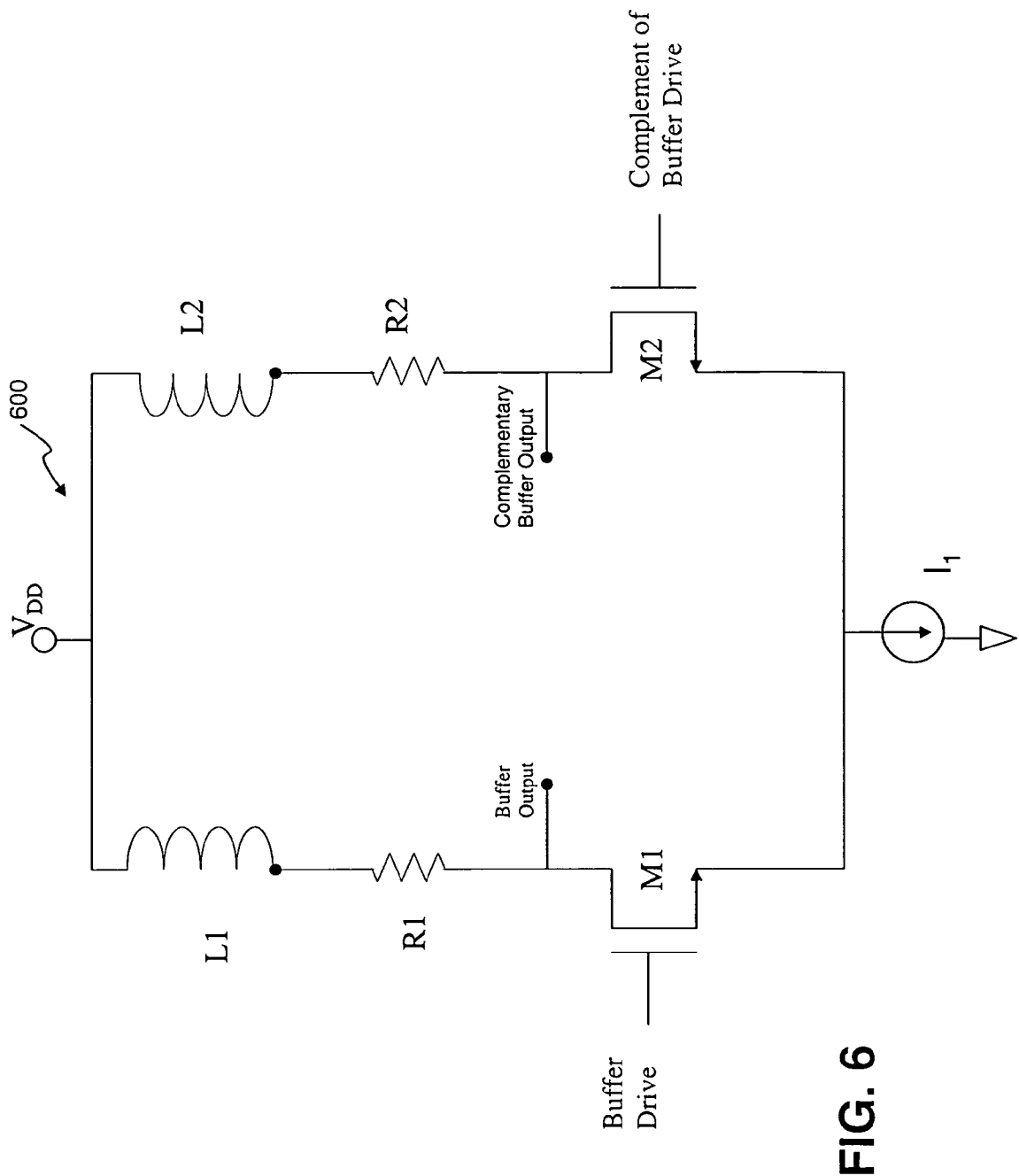
FIG. 6 is a simplified circuit diagram of a buffer for driving the clock and data recovery circuit of FIG. 1.

For instance, FIG. 6 is a simplified circuit diagram of a single stage high speed buffer 600 for driving the clock and data recovery circuit of FIG. 1. In this embodiment, a differential pair of inductively loaded NMOS FETs M1 and M2 are coupled between a positive voltage source VDD and a bias current source $I_1$. Advantageously, the use of inductive loads $L_1$ and $L_2$ tunes out the parasitic capacitive loading on the inputs of the buffer and increases the bandwidth of the device.

However, the spiral inductors $L_1$ and $L_2$ are relatively large devices that consume considerable die area driving up the relative cost and size of the receiver. In addition, the large spiral conductors also increase the length of the inter-connects between stages in a multi-stage buffer, thereby increasing the parasitic capacitive loading between stages. The increased capacitance increases power consumption and decreases the bandwidth of the device.

In addition high speed devices tend to consume considerable power as compared to low speed devices. Therefore, the elimination of the buffer stage(s) which typically drive the input of the clock and data recovery circuit of conventional receivers provides significant advantages in terms of cost, size and power consumption.

Figure 7:
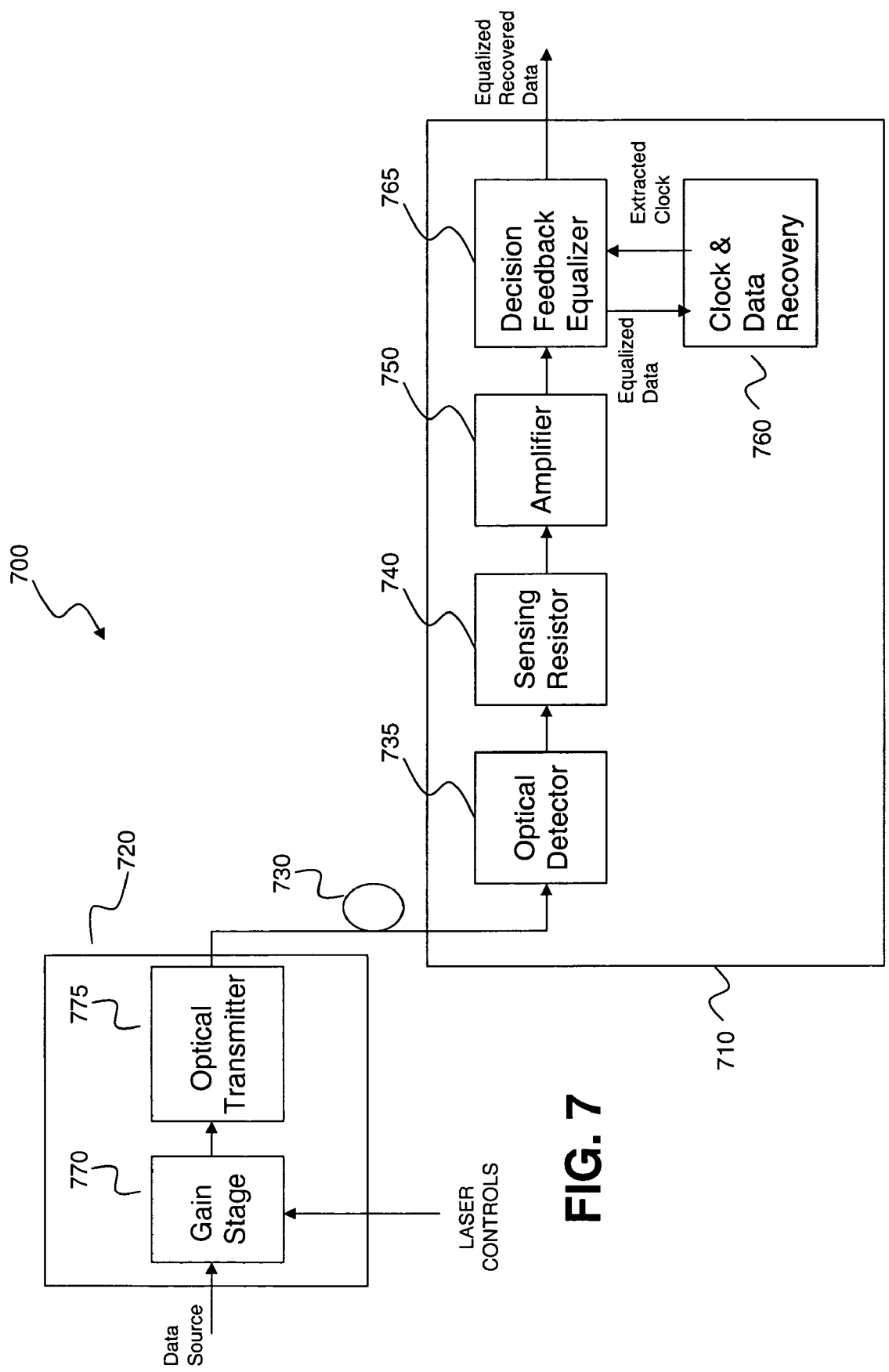
FIG. 7 is a simplified block diagram of one embodiment of an optical communication system.

The integrated decision feedback equalizer and clock and data recovery circuit illustrated in FIG. 4 may be integrated into any of a variety of applications. For example, referring to FIG. 7, the described exemplary integrated decision feedback equalizer and clock and data recovery circuit may be incorporated into the optical receiver assembly 710 of an optical communication system 700. The optical system 700 includes an optical transmitter 720 and an optical fiber network 730 that carries the optical signal to the optical receiver assembly 710. Those skilled in the art will appreciate that the present invention is not limited to a single optical transmitter and receiver. Rather practical optical communications systems may have one or more optical transmitters as well as one or more optical receivers.

The illustrated receive path includes an optical detector 735, sensing resistor 740, one or more amplifiers 750, clock and data recovery circuit 760, and decision feedback equalizer 765. The optical detector 735 can be any known prior art optical detector. Such prior art detectors convert incoming optical signals into corresponding electrical output signals that can be electronically monitored.

A transmit path includes, by way of example, one or more gain stage(s) 770 coupled to an optical transmitter 775. In one embodiment an analog data source provides an analog data signal that modulates the output of the optical transmitter. In other embodiments baseband digital modulation or frequency modulation may be used. In this embodiment the gain stage(s) amplify the incoming data signal and the amplified data signal in turn drives the optical transmitter 775.

The gain stage 770 may have multiple stages, and may receive one or more control signals for controlling various different parameters of the output of the optical transmitter. The optical transmitter may, for example, be a light emitting diode or a surface emitting laser or an edge emitting laser that operates at high speeds such as 10 Gigabits per second (Gbps) or higher.

A receive fiber optic cable 730 carries an optical data signal to the optical detector 735. In operation, when the transmitted optical beam is incident on a light receiving surface area of the optical detector, electron-hole pairs are generated. A bias voltage applied across the device generates a flow of electric current having an intensity proportional to the intensity of the incident light. In one embodiment, this current flows through sensing resistor 740, and generates a voltage.

The sensed voltage is amplified by the one or more amplifiers 750 and the output of amplifier 750 drives the decision feedback equalizer 765. As illustrated in FIG. 4, the decision feedback equalizer, includes, by way of example, a slicer that generates a binary signal (D3) that drives the clock and data recovery circuit 760. The clock and data recovery circuit generates an extracted clock signal from the binary signal which is coupled to a decision feedback equalizer retimer (as illustrated in FIG. 4) to retime the equalized data.

It will be appreciated by those of ordinary skill in the art that the invention can be embodied in other specific forms without departing from the spirit or essential character thereof. For example, the teachings herein may be applied to different types of receivers, decision feedback equalizers and clock and data recovery circuits. The present invention is therefore considered in all respects to be illustrative and not restrictive. The scope of the invention is indicated by the appended claims, and all changes that come within the meaning and range of equivalents thereof are intended to be embraced therein.

What is claimed is:

1. A communications system comprising:
    a decision feedback equalizer adapted to reduce channel related distortion in received data, wherein the decision feedback equalizer is configured to generate equalized data; and
    a clock and data recovery circuit coupled to the decision feedback equalizer, wherein the clock and data recovery circuit is configured to generate an extracted clock signal from the equalized data,
    wherein the decision feedback equalizer includes:
        a retimer that is configured to generate recovered equalized data from the equalized data in response to the extracted clock signal; and
        a multiplier coupled to the retimer, the multiplier being configured to apply an equalization coefficient to the recovered equalized data to generate an equalized feedback signal;
    wherein the clock and data recovery circuit is configured to iterate the equalization coefficient until the clock and data recovery circuit synchronizes with a frequency of the equalized data.

2. The communications system of claim 1 wherein the decision feedback equalizer comprises a summer that is configured to generate a combined signal by combining the equalized feedback signal with the received data.

3. The communications system of claim 2 wherein:
    the decision feedback equalizer further comprises a slicer coupled to the summer, wherein the slicer is configured to generate the equalized data by converting the combined signal into a binary signal; and
    the clock and data recovery circuit is configured to generate the extracted clock signal from the binary signal.

4. The communications system of claim 3 wherein:
    the retimer comprises a flip-flop coupled to the slicer and to the clock and data recovery circuit; and
    the flip-flop is configured to generate the recovered equalized data from the binary signal in response to the extracted clock signal.

5. The communications system of claim 3 wherein:
    the clock and data recovery circuit comprises a frequency acquisition loop and a phase lock loop,
    the frequency acquisition loop is configured to adjust a frequency of the extracted clock signal to maintain a fixed relationship between a frequency of a reference signal and the frequency of the extracted clock signal, and
    the phase lock loop is configured to adjust a phase of the extracted clock signal to maintain a fixed relationship between a phase of the binary signal and the phase of the extracted clock signal.

6. The communications system of claim 5 wherein the clock and data recovery circuit further comprises a frequency lock detector configured to determine when the frequency of the extracted clock signal is fixed relative to the frequency of the reference signal.

7. The communications system of claim 1, wherein the equalization coefficient is based on a bit error rate of the received data.

8. The communications system of claim 1, wherein
the clock and data recovery circuit is configured to adjust the equalization coefficient based on a frequency difference exceeding a threshold, the frequency difference being based on a frequency of a reference clock included in the clock and data recovery circuit and a frequency of a divided signal, the divided signal being generated from the extracted clock signal.

9. A communications system comprising:
a decision feedback equalizer comprising:
   a summer that is configured to combine an equalized feedback signal with the received data,
   a slicer coupled to the summer, the slicer being configured to convert the combined signal to a binary signal,
   a retimer coupled to the slicer, the retimer being configured to generate recovered equalized data from the binary signal in response to an extracted clock signal, and
   a multiplier coupled to the retimer, the multiplier being configured to apply an equalization coefficient to the recovered equalized data to generate the equalized feedback signal, and
a clock and data recovery circuit coupled to the slicer, the clock and data recovery circuit being configured to:
   generate the extracted clock signal from the binary signal; and
   vary the equalization coefficient based on a difference between a divided frequency of the extracted clock signal and a frequency of a reference clock.

10. The communications system of claim 9 wherein:
the clock and data recovery circuit comprises a frequency acquisition loop and a phase lock loop, the frequency acquisition loop being configured to adjust the frequency of the extracted clock signal to maintain a fixed relationship between the frequency of the reference clock and the frequency of the extracted clock signal, and
the phase lock loop is configured to adjust a phase of the extracted clock signal to maintain a fixed relationship between a phase of the binary signal and the phase of the extracted clock signal.

11. The communications system of claim 10 wherein the clock and data recovery circuit further comprises a frequency lock detector configured to determine when the frequency of the extracted clock signal is fixed relative to the frequency of the reference clock.

* * * * *